United States Patent
Ding et al.

(10) Patent No.: US 9,713,071 B2
(45) Date of Patent: Jul. 18, 2017

(54) PROVISIONING EXTERNAL IDENTIFIERS

(71) Applicants: NOKIA SOLUTIONS AND NETWORKS OY, Espoo (FI); Fu Ding, Beijing (CN); Devaki Chandramouli, Plano, TX (US); Rainer Liebhart, Munich (DE)

(72) Inventors: Fu Ding, Beijing (CN); Devaki Chandramouli, Plano, TX (US); Rainer Liebhart, Munich (DE)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

(21) Appl. No.: 14/431,975

(22) PCT Filed: Sep. 28, 2012

(86) PCT No.: PCT/US2012/057906
§ 371 (c)(1),
(2) Date: Mar. 27, 2015

(87) PCT Pub. No.: WO2014/051618
PCT Pub. Date: Mar. 4, 2014

(65) Prior Publication Data
US 2015/0264634 A1    Sep. 17, 2015

(51) Int. Cl.
*H04W 48/14* (2009.01)
*H04W 76/02* (2009.01)
*H04W 4/00* (2009.01)

(52) U.S. Cl.
CPC ........... *H04W 48/14* (2013.01); *H04W 4/001* (2013.01); *H04W 4/005* (2013.01); *H04W 76/021* (2013.01)

(58) Field of Classification Search
None
See application file for complete search history.

(56) References Cited

U.S. PATENT DOCUMENTS

| 6,665,711 B1 | 12/2003 | Boyle et al. |
| 2011/0021216 A1 | 1/2011 | Pudney et al. |
| 2011/0161441 A1 | 6/2011 | Haruna et al. |

(Continued)

FOREIGN PATENT DOCUMENTS

| CN | 102523315 A | 6/2012 |
| WO | 2011/098150 A1 | 8/2011 |

OTHER PUBLICATIONS

International Search Report and Written Opinion dated Dec. 11, 2012 corresponding to International Patent Application No. PCT/US2012/057906.

(Continued)

*Primary Examiner* — Kimberly A Williams
(74) *Attorney, Agent, or Firm* — Squire Patton Boggs (US) LLP

(57) ABSTRACT

The present invention provides a method, an apparatus and computer program product relating to provisioning external identifiers. The present invention includes receiving a request including an interworking function address, a subscriber identifier, a device identifier and at least one application identifier, generating, by the interworking function or by a home subscriber server, at least one external identifier based on the received subscriber identifier, device identifier and at least one application identifier.

17 Claims, 8 Drawing Sheets

(56) References Cited

U.S. PATENT DOCUMENTS

| | | | | |
|---|---|---|---|---|
| 2013/0084894 | A1* | 4/2013 | Jain | H04W 4/005 455/458 |
| 2013/0155954 | A1* | 6/2013 | Wang | H04W 4/005 370/328 |
| 2013/0308564 | A1* | 11/2013 | Jain | H04B 15/00 370/329 |
| 2013/0315155 | A1* | 11/2013 | Foti | H04W 72/0406 370/329 |
| 2014/0066047 | A1* | 3/2014 | Qiang | H04W 8/22 455/419 |
| 2014/0086144 | A1* | 3/2014 | Foti | H04L 61/106 370/328 |
| 2014/0220987 | A1* | 8/2014 | Wu | H04W 4/005 455/450 |
| 2014/0269779 | A1* | 9/2014 | Shan | H04W 28/24 370/509 |
| 2014/0317195 | A1* | 10/2014 | Xu | H04W 4/005 709/204 |
| 2015/0036591 | A1* | 2/2015 | Cao | H04W 4/12 370/328 |

OTHER PUBLICATIONS

J. Wang et al., "Updates to 3GPP2 M2M Reference Model," [online] Apr. 16, 2012, Qualcomm Incorporated, 44 pages.

TNO. "Mobile network improvements for M2M, a 3GPP perspective," [online] 2011, retrieved Nov. 24, 2012 at http://docbox.etsi.org/workshop/2011/201110_m2mworkshop/03_m2mcooperation/3gpp_norp.pdf, 14 pages.

3GPP TS 23.682 V11.2.0 (Sep. 2012), Technical Specification, 3rd Generation Partnership Project; Technical Specification Group Services and System Aspects; Architecture enhancements to facilitate communications with packet data networks and applications (Release 11), Sep. 2012, 29 pages.

3GPP TS 23.401 V11.3.0 (Sep. 2012), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 11), Sep. 2012, 283 pages.

Sierra Wireless: "Device element addressable external identifier solution", 3GPP Draft; S2-114122_Device_Element_XID, 3rd Generation Partnership Project (3GPP), Mobile Competence Center; vol. SA WG2; Oct. 4, 2011; XP050549305.

"3rd Generation Partnership Project; Technical Specification Group Services and System Aspects; System Improvements for Machine-Type Communications (MTC) (Release 11)" 3GPP Draft; 23888-B00, 3rd Generation Partnership Project (3GPP), Mobile Competence Centre; Sep. 18, 2012; XP050905493.

Extended European Search Report dated Apr. 19, 2016, issued in corresponding EP Application No. 12885480.9-1870.

* cited by examiner

PROVISIONING EXTERNAL IDENTIFIERS

FIELD OF THE INVENTION

The present invention relates to an apparatus, method and program for provisioning external identifiers.

BACKGROUND OF THE INVENTION

The Evolved Packet System (EPS), which is the successor of GPRS (General Packet Radio System), provides new radio interface and new packet core network functions for broadband wireless data access. Such EPS core network functions are the Mobility Management Entity (MME), Packet Data Network Gateway (PDN-GW) and Serving Gateway (S-GW). FIG. 1 shows a schematic overview of the EPS architecture, as described in [1].

A common packet domain Core Network is used for both Radio Access Networks (RAN) the GERAN and the UTRAN. This common Core Network provides GPRS services.

For Machine-Type-Communication (MTC) a new functional entity called MTC-IWF (interworking function) and some new interfaces (S6m, Tsp, Tsms, T5a/b/c and T4) were introduced to the 3GPP architecture. FIG. 2 shows a schematic overview of the 3GPP architecture for Machine-Type-Communication, as described in [2].

Main purpose of the MTC-IWF and the new interfaces in 3GPP Release 11 is to enable triggering of devices (e.g. in order to establish a PDN (Packet Data Network) connection/PDP (Packet Data Protocol) context) with or without MSISDN (Mobile Subscriber Integrated Services Digital Network) from an internal or external MTC Server.

In 3GPP Release 11, the external identifier was defined to replace MSISDN (as described in [2]) for PS (packet switched) only devices (e.g. dongles, M2M (machine-to-machine devices). This was to overcome the shortage of MSISDN (E.164 numbers). If M2M demand forecast grows over 200 million connections by 2013 and perhaps as high as 40 billion by 2020, then the geographic numbers are in short supply especially in certain rate centers. In the US alone, it may cost around $100+ billion to move to 12+ digit numbers. Thus the need to introduce a new internet type identifier (NAI (Network Access Identifier), FQDN (Fully-Qualified Domain Name), URI (Uniform Resource Identifier)) for PS only devices was seen as urgent. 3GPP Release 11 agreed to define NAI.

Traditionally, these identifiers (MSISDN and now external identifiers) are expected to be provisioned offline by the operators in the subscription database and assigned to the subscribers at the time of subscription. Provisioning external identifiers for millions of devices manually (especially when a single service provider subscribes for numerous devices, i.e. nationwide customers for an electricity company) becomes a labor intensive process, not to mention the associated cost and human errors that are associated with it. This calls for the need to consider other provisioning methods that can be automated in the system.

If some automated applications running in the device need external identifiers, then it needs to be provided offline. If such devices are deployed in remote areas, then again it increases the manual administrative cost of provisioning external identifiers.

For a low ARPU (Average Revenue per User) M2M business, manual provisioning of external identifiers may not be cost effective. Furthermore, as per Release 11, each application running in the device could be assigned a different external identifier (as described in [2]). From MNO's (Mobile Network Operators) perspective, manually provisioning external identifiers for millions of devices (many for each device) could be cost prohibitive and not justified, thus the need for a solution to provision them automatically is warranted.

Currently, 3GPP specifies the properties of an external identifier (e.g., LocalIdentifier@domainIdentifier) but 3GPP does not specify how the external identifiers are provisioned in the HSS (Home Subscriber Server) and provided to the user. Provisioning is assumed to be done offline and manually by MNO. As per solution specified for Release 11, it is not required by the network to send it to the device. Thus there is no known solution to automate provisioning of external identifiers in the HSS and in the device.

REFERENCES

[1]: 3GPP TS 23.401 V11.3.0 (2012-09), 3rd Generation Partnership Project; Technical Specification Group Services and System Aspects; General Packet Radio Service (GPRS) enhancements for Evolved Universal Terrestrial Radio Access Network (E-UTRAN) access (Release 11).

[2]: 3GPP TS 23.682 V11.2.0 (2012-09), 3rd Generation Partnership Project; Technical Specification Group Services and System Aspects; Architecture enhancements to facilitate communications with packet data networks and applications (Release 11).

SUMMARY OF THE INVENTION

It is therefore an object of the present invention to overcome the above drawbacks and to provide methods, apparatuses and a program for provisioning external identifiers in the HSS, M2M application and in the device.

According to an aspect of the present invention there is provided a method comprising:
  receiving a request including an interworking function address, a subscriber identifier, a device identifier and at least one application identifier,
  generating, by the interworking function or by a home subscriber server, at least one external identifier based on the received subscriber identifier, device identifier and at least one application identifier.

According to further refinements of the present invention as defined under the above aspect, the method further comprises
  mapping, by the interworking function or by the home subscriber server, the at least one external identifier to the subscriber identifier;
  forwarding, by the home subscriber server, the at least one external identifier to an interworking function;
  forwarding, by the interworking function, the at least one external identifier to a home subscriber server and a services capability server;
  mapping, by a services capability server, the at least one external identifier and the at least one application identifier to said device identifier;
  wherein each of the at least one external identifier is unique.

According to another aspect of the present invention there is provided an apparatus, comprising:
  a receiver/transmitter configured to communicate with at least another apparatus,
  a memory configured to store computer program code, and
  a processor configured to cause the apparatus to perform:

receiving a request including an interworking function address, a subscriber identifier, a device identifier and at least one application identifier, generating at least one external identifier based on the received subscriber identifier, device identifier and at least one application identifier.

According to further refinements of the present invention as defined under the above aspect, the processor is further configured to cause the apparatus to perform mapping the at least one external identifier to the subscriber identifier;

forwarding the at least one external identifier to an interworking function;

forwarding the at least one external identifier to a home subscriber server and a services capability server;

mapping the at least one external identifier and the at least one application identifier to said device identifier;

wherein each of the at least one external identifier is unique.

According to further refinements of the present invention as defined under the above aspect, the apparatus is a home subscriber server or an interworking function.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION

In the following, aspects/embodiments of the present invention are described by referring to general and specific examples of the aspects/embodiments, wherein the features of the aspects/embodiments can be freely combined with each other unless otherwise described. It is to be understood, however, that the description is given by way of example only, and that the described aspects/embodiments are by no means to be understood as limiting the present invention thereto.

The main idea of the invention is to propose automated methods for provisioning external identifiers in the HSS, M2M application and in the device.

Thus, according to the present invention, there is proposed a solution to automatically generate and provision the external identifier in the HSS and in M2M applications.

Further, according to the present invention there is proposed a solution to provision external identifier in the device for applications that need its own external identifier.

Figure 1:
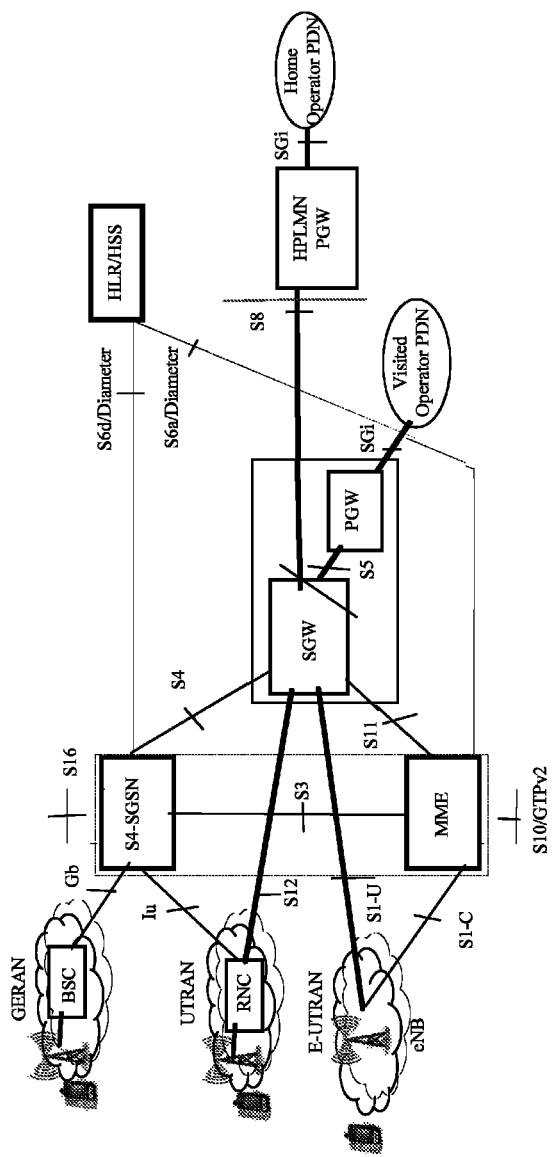
FIG. 1 is a diagram illustrating a schematic overview of an EPS architecture.
Figure 2:
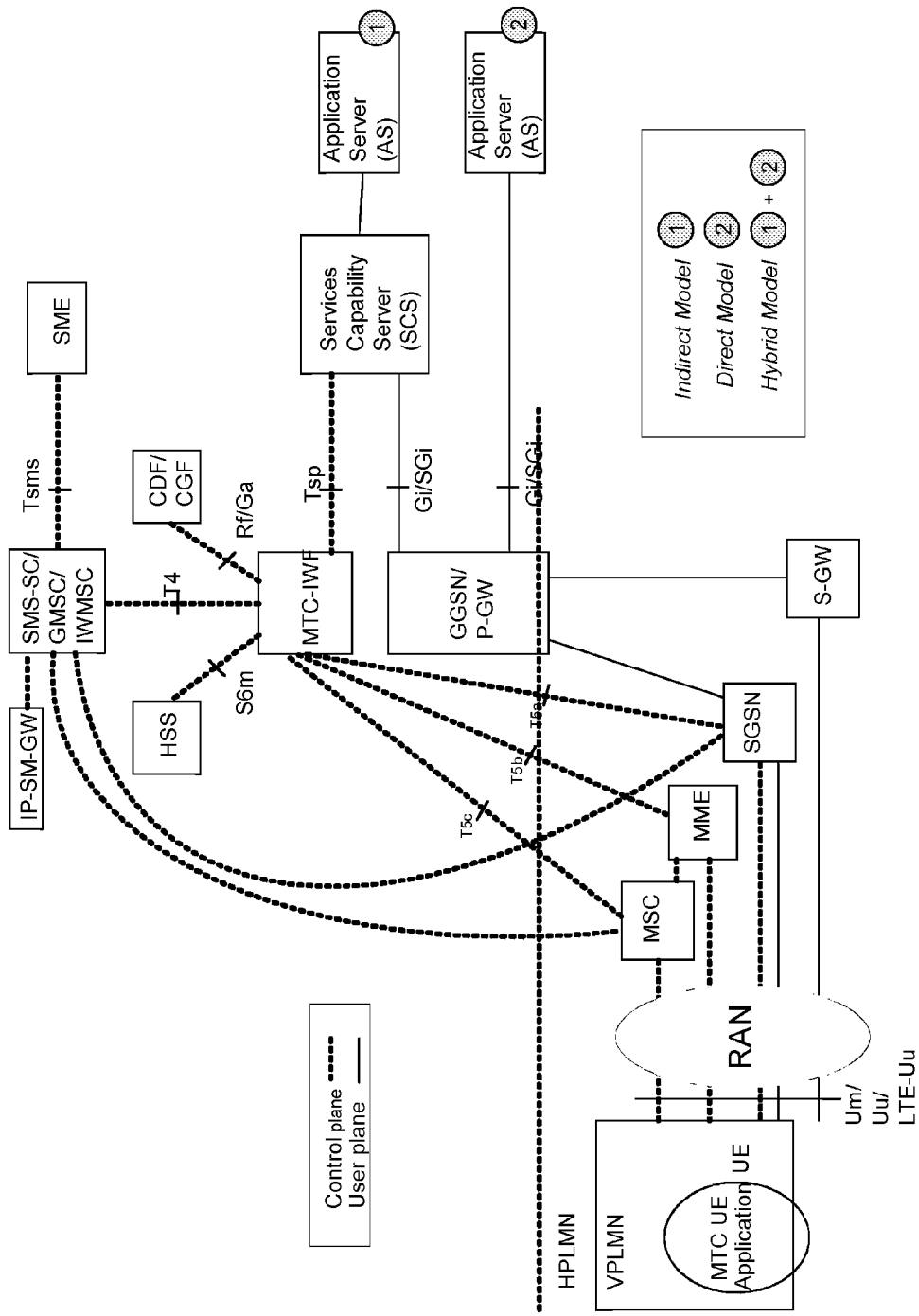
FIG. 2 is a diagram illustrating a schematic overview of the 3GPP architecture for Machine-Type-Communication.
Figure 3:
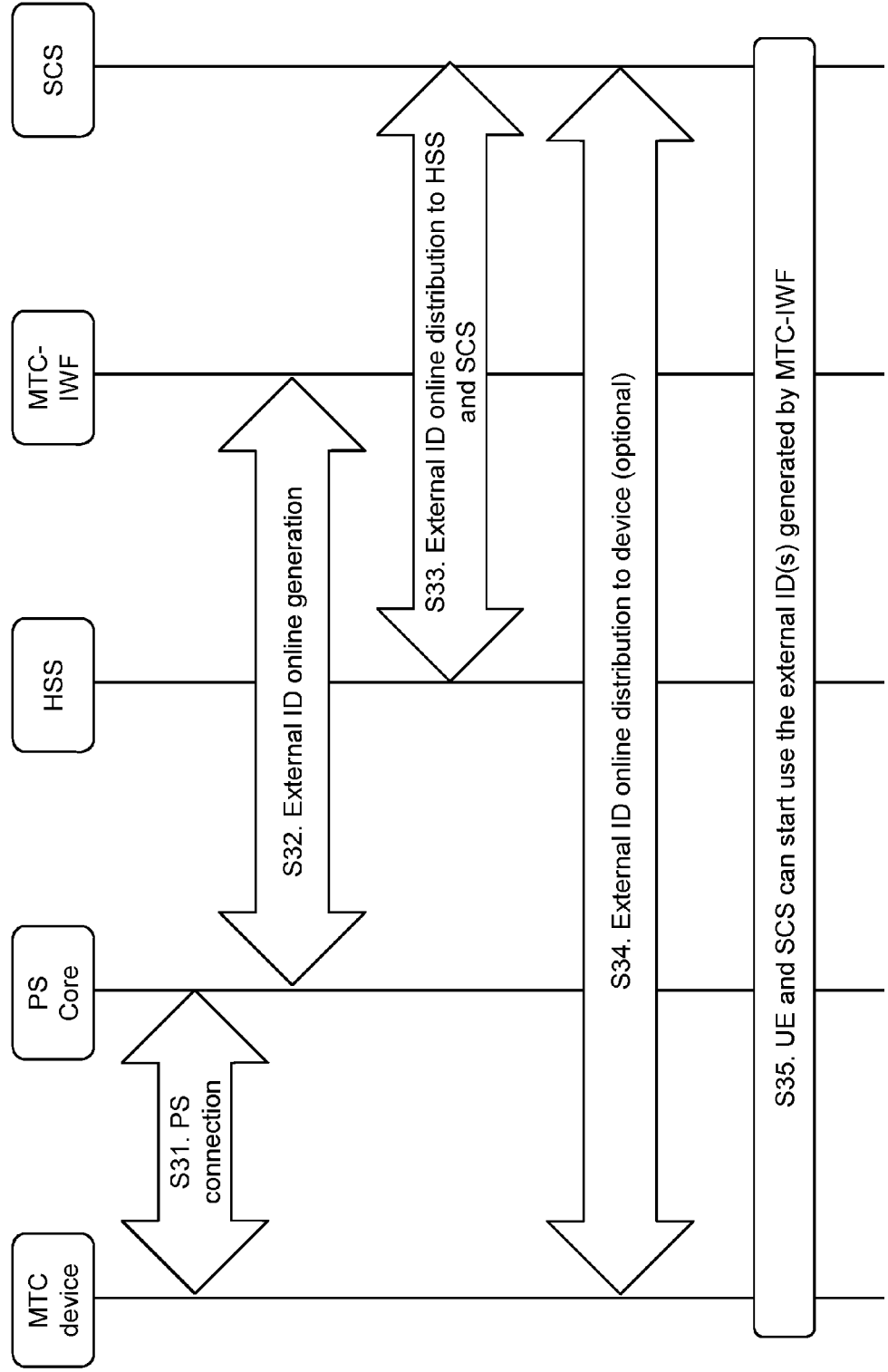
FIG. 3 is a diagram illustrating a principle of an embodiment of the present invention.

FIG. 3 is a diagram illustrating the main idea of the present invention.

As shown in FIG. 3, in a step S31, a PS connection between UE and the network is established for the whole provisioning process (if this PS connection is considered to be part of initial subscriber provisioning, it could limit the device's access to the MTC-IWF only and use a special APN (Access Point Name)).

In step S32, on the PS connection, the external ID(s) for the MTC device is generated online with the help of the network.

In step S33, the generated external ID(s) is (are) further distributed online to the HSS and the SCS (Services Capability Server).

In step S34, external ID(s) is (are) further distributed online to the MTC device, if necessary.

Finally, in step S35, UE and SCS can start using the generated external ID(s).

The principles of the present invention can be applied to a single device running a single application or multiple applications. This can also be applied in a gateway configuration with lots of, for example, 1000 devices running behind the gateway.

In the following, the principles of the present invention will be described in more detail.

First, generation and distribution of the external ID(s) to the HSS and the SCS (i.e. steps S32 and S33 in FIG. 3) will be explained in more detail.

There are 2 possible solutions to automatically generate and provision external identifiers within the network. In option 1, application level information needed for external ID generation is send to the network by the UE itself. To minimize impact to existing network elements, such application level information will be transparent to the network. In option 2, application level information is send to the network by the SCS.

Option 1:

According to option 1, the HSS triggers the generation of external identifier based on indications received from the UE during registration procedure and subscription information that has been provisioned in the network.

Figure 4:
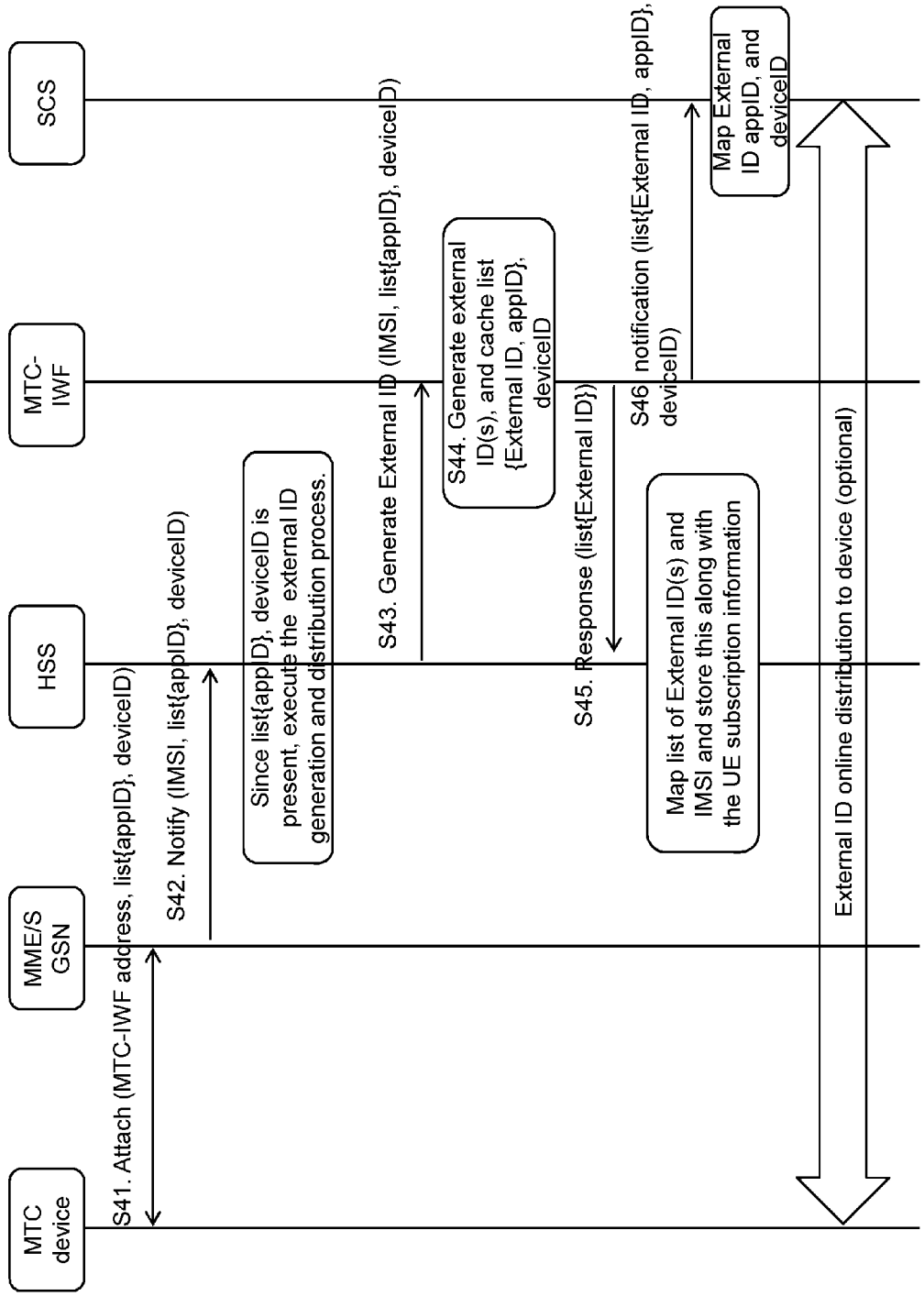
FIG. 4 is a signaling diagram illustrating signaling according to a certain embodiment of the present invention.
Figure 5:
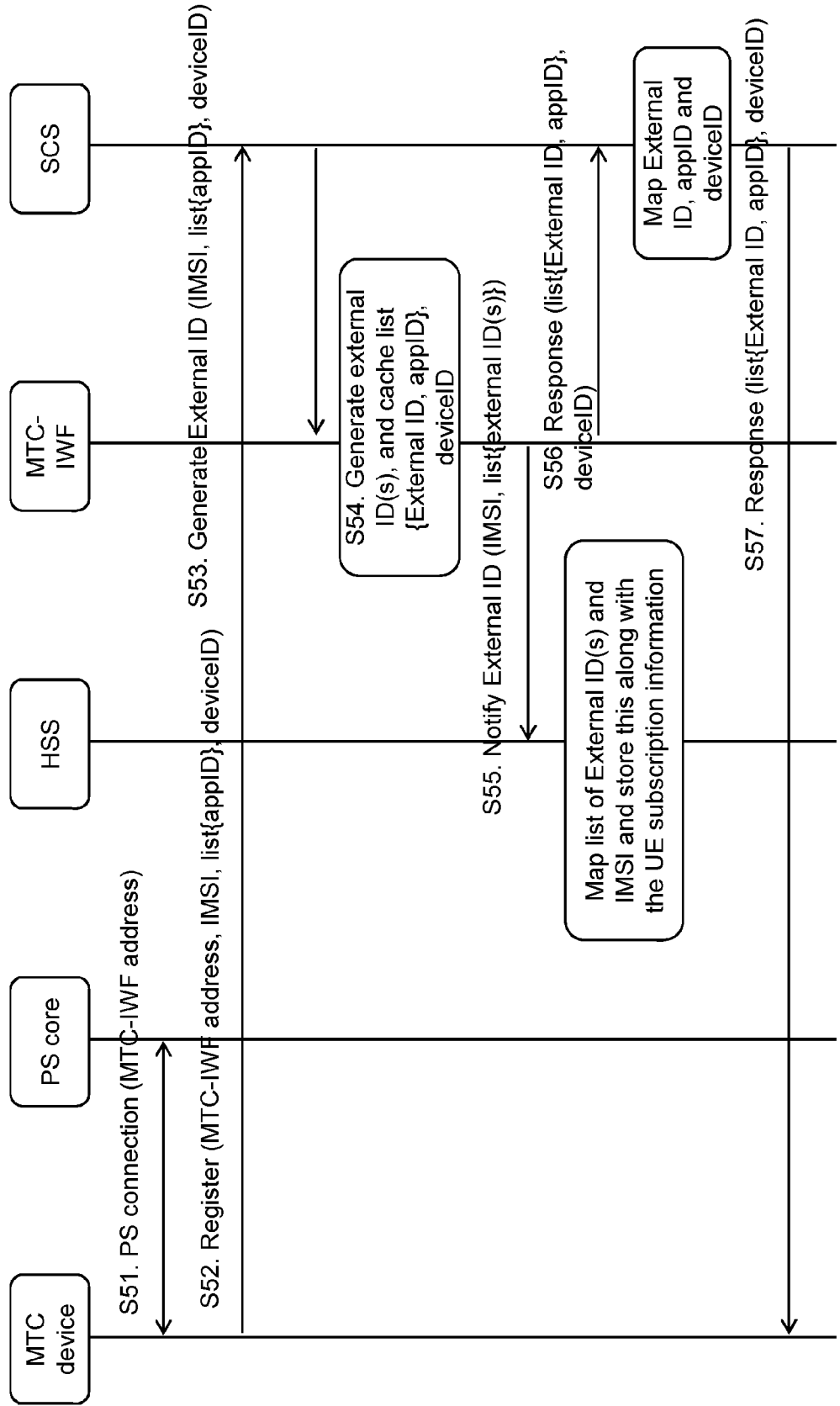
FIG. 5 is a signaling diagram illustrating another signaling according to a certain embodiment of the present invention.

FIG. 4 shows a call flow that illustrates how an external identifier can be generated online and is then provisioned in the HSS and the SCS.

In a step S41, the UE initiates PS session setup procedure with the network. During the process, the network provides additional information such as MTC-IWF address to the device. Also, if the UE needs to request external ID for its applications, it will provide a list of appID along with the device ID to the network. AppID is some application layer identifier to identify the specific application(s) on the specific MTC device which will communicate with SCS/AS on application layer over the PS connection. They are transparent to the network, only known by the application running in the UE, and SCS/AS. These parameters (MTC-IWF address, list {appID}, device ID) are conveyed in the PCO IE (Protocol Configuration Option Information Element) of the session setup procedure.

In a step S42, the MME/SGSN (Mobility Management Entity/Serving GPRS Support Node) will notify HSS of the list of appID, and the device ID received from the MTC device. If the list of appID is present, HSS will start the external ID generation and distribution process. If list {appID} is not present, HSS will not start the process. This ensures that external ID will only be generated when explicitly requested by the UE.

Then, in a step S43, the HSS will forward the IMSI, device ID and list of appID within a "generate external ID request" message to MTC-IWF, wherein a logical function responsible for external ID generation will handle the request. The message may optionally include the SCS ID for the UE if this is available in the subscription. Optionally HSS can directly generate external IDs for each appID in the list, store external IDs in the subscription data and inform the MTC-IWF. MTC-IWF to be contacted can be pre-configured based on UE's IMSI (International Mobile Subscriber Identity) or SCS ID (Services Capability Server Identification) (if available) or be provided by the UE in step 1 and forwarded by MME/SGSN in step S42.

In step S44, the MTC-IWF generates a new external identifier for each appID in the list. As per 3GPP requirements, the new generated external identifier should be globally unique. This is described later in more detail.

In step S45, the MTC-IWF responds to HSS with the list of newly generated external identifiers. HSS then maps the list of external IDs to the corresponding IMSI and stores this along with the UE subscription information.

In a step S46, the MTC-IWF sends an indication to the SCS with the list of 2-tuple (appID, external identifier), device ID. SCS will store the mapping for later use. SCS informs the Application Server (AS) about device ID, appID and generated external ID. AS can now store the external ID together with the appID, device ID that is specific for the device and application. In order to trigger a certain application on a device, device ID and appID has to be mapped to external ID.

Further, if necessary, the SCS will distribute the newly generated external identifier(s) to the MTC device.

Option 2:

According to option 2, in a step S51, the UE initiates PS session setup procedure with the network. During the process, the network provides additional information such as the MTC-IWF address to the device.

Then, in a step S52, the MTC device registers to its SCS on application layer. This message contains the IMSI to identify the requesting UE. Alternatively, an IPv6 address or any other network layer identifier which can uniquely identify the UE can be used. Further, a list of appID(s) which need to allocate external ID(s) and the device ID that uniquely identifies the device is contained in the message. Optionally, MTC-IWF address is contained so that SCS can know the destination of the following step S53.

In step S53, the SCS sends a "generate external ID" request to MTC-IWF. This request contains the network layer identifier of the MTC device (IMSI, IPv6 address, or any other device ID) and the list of appIDs are contained in the request.

In step S54, the MTC-IWF then generates a new external identifier for each appID in the list. As mentioned above, the newly generated external identifier should be globally unique.

In step S55, the MTC-IWF notifies HSS of the list of newly generated external identifiers, providing also the IMSI to the HSS. HSS then maps the list to the corresponding IMSI and stores this along with the UE subscription information.

In step S56, the MTC-IWF sends an indication to the SCS with the list of 2-tuple (appID, external identifier) and the SCS will store the mapping for later use.

As response of step S52, the SCS optionally notifies the MTC device with the list of generated external ID(s) for each appID in step S57.

In the following, the automatic provisioning of external identifier in the device will be described.

The external identifier generated either online (using the method described above) or offline (traditional manual provision) can be provisioned in the device via OMA-DM (Open Mobile Alliance Device Management) or OTA (Over-the-air), or by any application layer mechanism. The call flow shown in FIG. 6 illustrates how external identifier can be provisioned in the device using OMA-DM.

Figure 6:
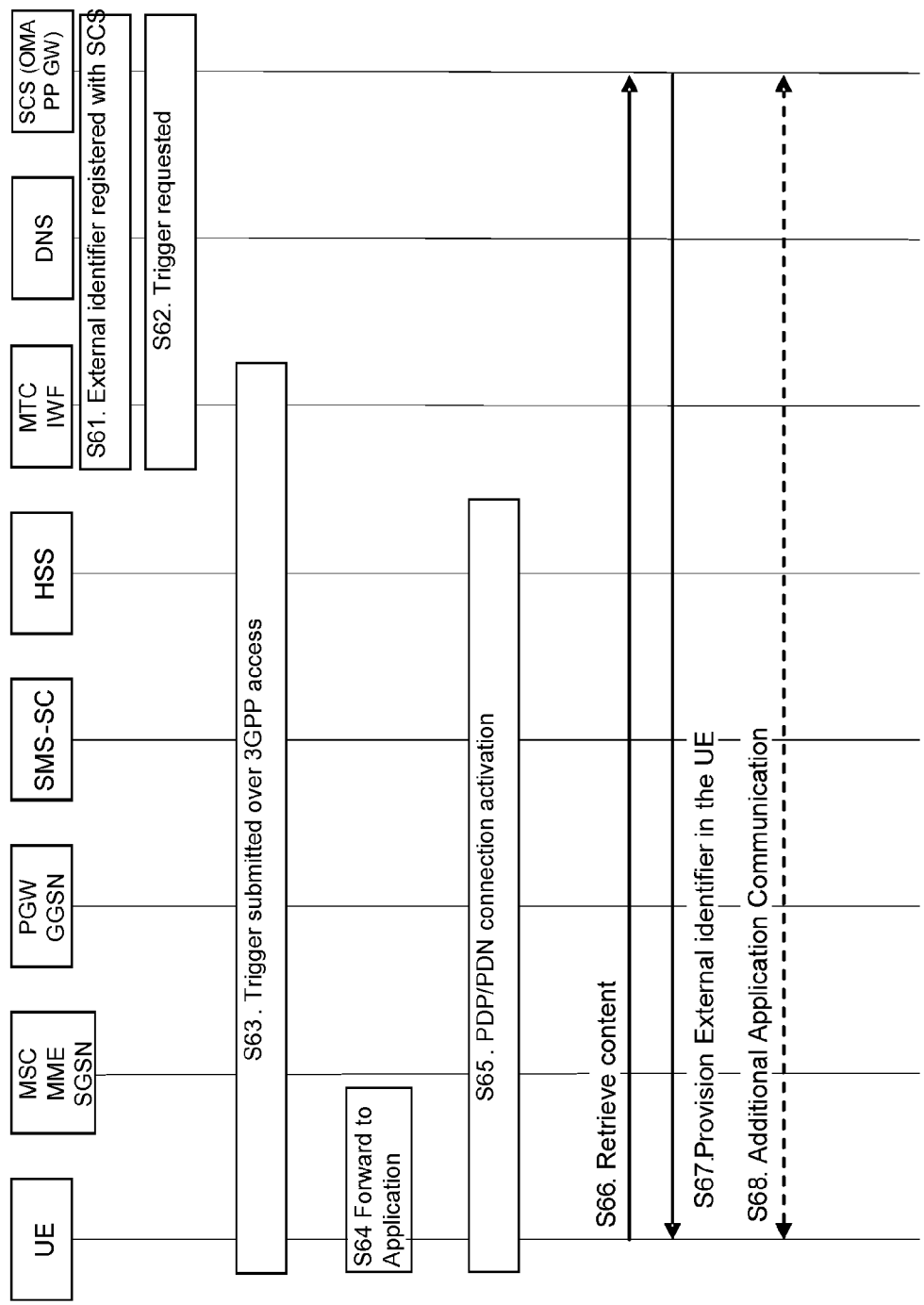
FIG. 6 is a signaling diagram illustrating provisioning the external ID to a device according to a certain embodiment of the present invention.

According to FIG. 6, in a step S61, the external ID generated offline or online (using the mechanism described above) is provisioned in the SCS which is acting as an OMA DM push proxy gateway (OMA PP GW).

In step S62, the OMA DM push proxy gateway communicates with the IWF to trigger the device using external identifier.

In step S63, the IWF submits the device trigger request over 3gpp access. The UE receives the trigger and forwards it to the appropriate application in a step S64.

In step S65, a trigger application processes the trigger and triggers the establishment of a PDP/PDN connection.

In step S65, the UE initiates communication with the push proxy gateway to obtain content and the push proxy gateway provisions the device with external identifier along with other parameters in step S66.

In step S68, additional application communication may happen depending on the content received.

As set out above, the generation of a globally unique external identifier is to be ensured.

The external identifier generation as set out above can be performed using appID (i.e. appID is encoded to be application and device specific) or a combination of app ID (application specific) and device ID (device specific). In either case, if the appID or the device ID contain operator's domain name or service provider's domain name encoded in some format (e.g. URI, NAI), the resulting external identifier will be globally unique.

Figure 7:
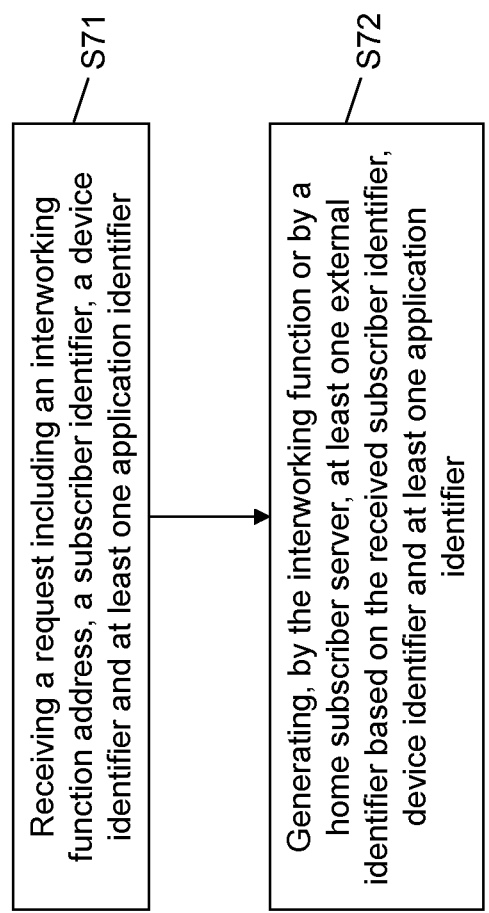
FIG. 7 is a flowchart illustrating a method according to certain aspects of the present invention.

FIG. 7 is a flowchart illustrating processing of the apparatus according to certain embodiments of the present invention.

According to an embodiment of the present invention, first, in a step S71, a network entity, i.e. the HSS or the MTC-IWF, receives a request including an interworking function address, a subscriber identifier, a device identifier and at least one application identifier, and then, in a step S72, generates at least one external identifier based on the received subscriber identifier, device identifier and at least one application identifier.

In case the network entity is the HSS, it maps the at least one external identifier to the subscriber identifier and forwards the at least one external identifier to an interworking function.

Further, if the network entity is MTC-IWF, it forwards the at least one external identifier to a subscriber server and a services capability server.

In any case, it is noted that the each of the at least one external identifier is globally unique.

Further, the services capability server maps the at least one external identifier and the at least one application identifier to said device identifier.

Figure 8:
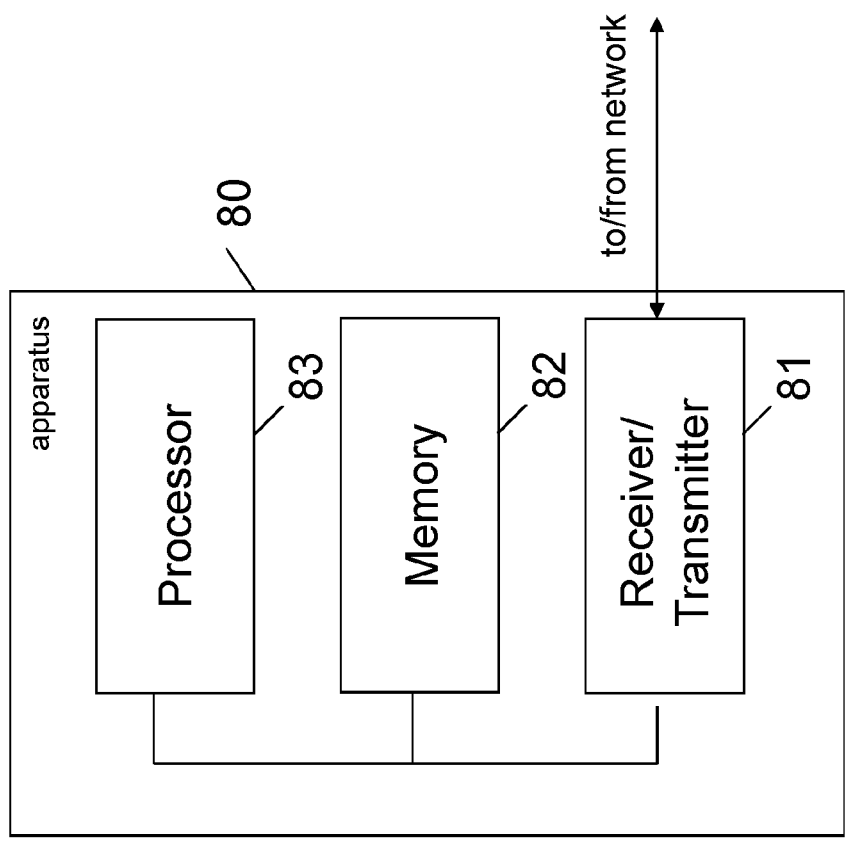
FIG. 8 is a block diagram showing an example of an apparatus according to certain aspects of the present invention.

FIG. 8 is a block diagram showing an example of an apparatus according to certain embodiments of the present invention.

As shown in FIG. 8, according to an aspect of the present invention, the apparatus 80, i.e. the network element, comprises a receiver/transmitter 81, a memory 82 and a processor 83. The receiver/transmitter 81 is configured to communicate with at least another apparatus in the network and to transmit and receive signals, the memory 82 is configured to store computer program code, and the processor 83 is configured to cause the apparatus to perform receiving a request including an interworking function address, a subscriber identifier, a device identifier and at least one application identifier, generating at least one external identifier based on the received subscriber identifier, device identifier and at least one application identifier.

As set out above, according to an aspect of the present invention, the apparatus is a home subscriber server or an interworking function.

According to the embodiments of the present invention as described above, the following benefits are achieved.

The traditional manual provisioning of external identifier is replaced with automatic provisioning of external identifier which saves significant amount of labor cost.

This is extremely beneficial in a gateway environment with 1000's of devices running behind the GW, and it enables automated applications running in the device to use external identifier.

The embodiments of the present invention can be applied to any 3GPP (LTE, GERAN, UTRAN) or 3GPP2 access technologies and the proposed solution can be extended to any PS only device (e.g. dongles).

In the foregoing exemplary description of the apparatus, only the units that are relevant for understanding the principles of the invention have been described using functional blocks. The apparatus may comprise further units that are necessary for its respective operation. However, a description of these units is omitted in this specification. The arrangement of the functional blocks of the apparatus is not construed to limit the invention, and the functions may be performed by one block or further split into sub-blocks.

When in the foregoing description it is stated that the apparatus (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that method steps likely to be implemented as software code portions and being run using a processor at an apparatus (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the embodiments and general and specific examples described above are provided for illustrative purposes only and are in no way intended that the present invention is restricted thereto. Rather, it is the intention that all variations and modifications which fall within the scope of the appended claims are covered.

Abbreviations:
ARPU Average Revenue per User
AS Application Server
BSC Base Station Controller
DNS Domain Name System
E-UTRAN Evolved UTRAN
EDGE Enhanced Data Rates for GSM Evolution
eNB Evolved NodeB
Ext ID External Identifier (could be NAI, URI or FQDN)
FQDN Fully Qualified Domain Name
GERAN GSM EDGE Radio Access Network
GPRS General Packet Radio Service
GSM Global System for Mobile Communications
H-IWF Home network interworking function
HLR Home Location Register
HSS Home Subscriber Server
IMSI International Mobile Subscriber Identity
ISDN Integrated Services Digital Network
IWF Interworking Function
M2M Machine to machine
MCC Mobile Country Code
MME Mobility Management Entity
MNC Mobile Network Code
MSISDN Mobile Subscriber ISDN
MTC Machine Type Communication
OA&M Operation, Administration and Maintenance
PCO IE Protocol Configuration Option Information Element
PDN Packet Data Network
PDP Packet Data Protocol
PLMN Public Land Mobile Network
PS Packet Service
RAN Radio Access Network
RNC Radio Network Controller
SCS Services Capability Server
SIMTC System Improvements for Machine Type Communication (3GPP Rel-11 work item)
S-GW Serving Gateway
SGSN Serving GPRS Support Node
UE User Equipment
UTRAN UMTS Terrestrial Radio Access Network
UMTS Universal Mobile Telecommunications System
V-IWF Visited network interworking function

The invention claimed is:

1. A method in a communications system of hardware entities, comprising:
receiving by at least one of a mobility management entity and a home subscriber server a request including an interworking function address, a subscriber identifier, a device identifier and at least one application identifier; and
generating, by an interworking function or by the home subscriber server, at least one new external identifier based on the received subscriber identifier, device identifier and at least one application identifier,
wherein the at least one new external identifier is a different identifier than the subscriber identifier, device identifier, and at least one application identifier.

2. The method according to claim 1, further comprising mapping, by the interworking function or by the home subscriber server, the at least one external identifier to the subscriber identifier.

3. The method according to claim 1, further comprising forwarding, by the home subscriber server, the at least one external identifier to the interworking function.

4. The method according to claim 1, further comprising forwarding, by the interworking function, the at least one external identifier to a home subscriber server and a services capability server.

5. The method according to claim 4, further comprising mapping, by a services capability server, the at least one external identifier and the at least one application identifier to said device identifier.

6. The method according to claim 1, wherein each of the at least one external identifier is unique.

7. A mobility management entity apparatus, comprising:
a receiver/transmitter configured to communicate with at least another apparatus,
a memory configured to store computer program code, and
a processor configured to cause the apparatus to perform:
receiving a request including an interworking function address, a subscriber identifier, a device identifier and at least one application identifier; and
generating at least one new external identifier based on the received subscriber identifier, device identifier and at least one application identifier,
wherein the at least one new external identifier is a different identifier than the subscriber identifier, device identifier, and at least one application identifier.

8. The apparatus according to claim 7, wherein the processor is further configured to cause the apparatus to perform mapping the at least one external identifier to the subscriber identifier.

9. The apparatus according to claim 7, wherein the processor is further configured to cause the apparatus to perform forwarding the at least one external identifier to an interworking function.

10. The apparatus according to claim 7, wherein the processor is further configured to cause the apparatus to perform forwarding the at least one external identifier to a subscriber server and a services capability server.

11. The apparatus according to claim 7, wherein the processor is further configured to map the at least one external identifier and the at least one application identifier to said device identifier.

12. The apparatus according to claim 7, wherein each of the at least one external identifier is unique.

13. The apparatus according to claim 7, wherein the apparatus is a home subscriber server or an interworking function.

14. A computer program product embodied on a non-transitory computer-readable medium, said computer-readable medium comprising software code portions for performing the steps of claim 1 when the program is run on the processing device.

15. The computer program product according to claim 14, wherein the program is directly loadable into an internal memory of the processing device.

16. An interworking function apparatus, comprising:
a receiver/transmitter configured to communicate with at least another apparatus,
a memory configured to store computer program code, and
a processor configured to cause the apparatus to perform:

receiving a request including a subscriber identifier, a device identifier and at least one application identifier; and generating at least one new external identifier based on the received subscriber identifier, device identifier and at least one application identifier, wherein the at least one new external identifier is a different identifier than the subscriber identifier, device identifier, and at least one application identifier.

17. A communications system comprising an interworking function apparatus and a mobility management entity apparatus wherein the mobility management apparatus comprises:

a receiver/transmitter configured to communicate with at least another apparatus, a memory configured to store computer program code, and a processor configured to cause the apparatus to perform receiving a request including an interworking function address, a subscriber identifier, a device identifier and at least one application identifier, and wherein the interworking function apparatus comprises:

a receiver/transmitter configured to communicate with at least another apparatus, a memory configured to store computer program code, and a processor configured to cause the apparatus to perform generating at least one new external identifier based on the received subscriber identifier, device identifier and at least one application identifier, wherein the at least one new external identifier is a different identifier than the subscriber identifier, device identifier, and at least one application identifier.

* * * * *